United States Patent
Matsumura et al.

(10) Patent No.: US 8,488,421 B2
(45) Date of Patent: Jul. 16, 2013

(54) LENS CLEANER AND OPTICAL DISC DEVICE

(71) Applicant: Panasonic Corporation, Osaka (JP)

(72) Inventors: Asayuki Matsumura, Osaka (JP); Takuya Wada, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/687,296

(22) Filed: Nov. 28, 2012

(65) Prior Publication Data

US 2013/0142026 A1    Jun. 6, 2013

(30) Foreign Application Priority Data

Dec. 2, 2011 (JP) ................................. 2011-264341

(51) Int. Cl.
 *G11B 7/00* (2006.01)
(52) U.S. Cl.
 USPC ..................................................... 369/44.14
(58) Field of Classification Search
 USPC .......... 369/44.12, 44.14, 44.15, 53.12, 53.26, 369/53.38, 13.36, 53.2, 71, 72
 See application file for complete search history.

(56) References Cited

U.S. PATENT DOCUMENTS 6,904,607 B2 * 6/2005 Wada ............................ 720/684
6,973,011 B2 * 12/2005 Murakami et al. .......... 369/13.36

FOREIGN PATENT DOCUMENTS

| JP | 2000-331447 | 11/2000 |
|---|---|---|
| JP | 2001-256622 | 9/2001 |
| JP | 2002-92920 | 3/2002 |
| JP | 2005-203013 | 7/2005 |
| JP | 2008-112498 | 5/2008 |

* cited by examiner

*Primary Examiner* — Nabil Hindi
(74) *Attorney, Agent, or Firm* — Wenderoth, Lind & Ponack, L.L.P.

(57) ABSTRACT

A lens cleaner capable of more surely cleaning grime off from an objective lens is provided. A lens cleaner of the present invention includes first and second lens cleaning portions. The first lens cleaning portion is provided to be brought into contact with a lens protector when the lens cleaner is rotated, to cause an objective lens to be away from a recording or reproducing position against an elastic force of an elastic member. The second lens cleaning portion is provided on an upstream side in a rotation direction relative to the first lens cleaning portion. The second lens cleaning portion is provided to pass above the lens protector while the objective lens is away from the recording or reproducing position, and to be brought into contact with the objective lens when the objective lens returns to the recording or reproducing position by the elastic force of the elastic member.

7 Claims, 14 Drawing Sheets

LENS CLEANER AND OPTICAL DISC DEVICE

BACKGROUND OF THE INVENTION

The present invention relates to an optical disc device that performs recording or reproduction of information on or from an optical disc such as a CD (compact disc), a DVD (digital versatile disc), or the like. In particular, the present invention relates to a lens cleaner that cleans an objective lens of an optical head included in such an optical disc device.

Conventionally, an optical disc device of this kind has the structure such as shown in FIGS. 19 and 20. FIG. 19 is a partial enlarged perspective view showing the structure of a conventional optical disc device. FIG. 20 is a partial enlarged schematic cross-sectional view of the conventional optical disc device in an optical disc recording or reproducing mode.

The conventional optical disc device includes a chassis 101 that retains components. The chassis 101 is provided with a spindle motor 103 that rotates a turntable 102 to which an optical disc 100 is attached, and an optical head 104 that performs recording or reproduction of information on or from the optical disc 100.

The optical head 104 records information on the optical disc 100 by emitting light from an objective lens 104a to the optical disc 100 that is placed on the turntable 102 and that rotates in a rotation direction X100 of the turntable 102. Further, the optical head 104 reproduces information recorded on the optical disc 100 by emitting light from the objective lens 104a to the rotating optical disc 100, to detect the reflected light from the optical disc 100.

The objective lens 104a is held by an actuator body 104b. The actuator body 104b is attached to one ends of a plurality of suspension wires 104c. The other ends of the suspension wire 104c are attached to an optical base 104d that serves as the shell of the optical head 104. The suspension wires 104c hold the actuator body 104b, thereby elastically holding the objective lens 104a at a recording or reproducing position A100.

In connection with the conventional disc device having the structure described above, in the case where dirt or dust attaches to the objective lens 104a of the optical head 104, the light cannot appropriately be emitted. This makes it difficult for recording or reproduction of information on or from the optical disc 100 to be achieved. Accordingly, a lens cleaner is used in order to clean the objective lens 104a (e.g., see Japanese Unexamined Patent Publication No. 2000-331447).

FIGS. 21 and 22 are each a cross-sectional view showing a manner of cleaning the objective lens 104a using a conventional lens cleaner.

A conventional lens cleaner 110 is formed to be disc-like, so as to be attached onto the turntable 102 and rotated in the rotation direction X100. The lens cleaner 110 is provided with a cleaning member 111 that can be brought into contact with the objective lens 104a when the lens cleaner 110 is attached onto the turntable 102 and rotated. By the lens cleaner 110 being rotated in the rotation direction X100 and the cleaning member 111 and the objective lens 104a being brought into contact with each other, dirt or dust attached to the objective lens 104a is cleaned.

In the conventional general optical disc device, in order to prevent the objective lens 104a from being brought into contact with the optical disc 100, a lens protector 104e is provided so as to project toward the optical disc 100 than the objective lens 104a does. For the purpose of enhancing the effect of avoiding contact between the objective lens 104a and the optical disc 100, the lens protector 104e is provided in close proximity to the objective lens 104a. Further, normally, the optical disc 100 is provided with a protrusion referred to as a stack rib for avoiding any damage that may be done to the recording face or sticking of the optical discs 100 when the optical discs 100 are stacked. It is desirable that the lens protector 104e is provided at the position where it will not be brought into contact with the stack rib, from the viewpoint of achieving a reduction in thickness of the device. Further, when the lens protector 104e is provided on the downstream side in the rotation direction X100 relative to the objective lens 104a, the barycenter of the objective lens 104a shifts toward the downstream side. This makes it difficult for the suspension wires 104c to elastically hold the objective lens 104a at the recording or reproducing position A100. Thus, in the conventional general optical disc device, the lens protector 104e is provided on the upstream side in the rotation direction X100 relative to the objective lens 104a.

Accordingly, when the lens cleaner 110 is rotated in the rotation direction X100, first, as shown in FIG. 21, the cleaning member 111 is brought into contact with the lens protector 104e, to push down the lens protector 104e against the elastic force of the suspension wires 104c. Thus, the objective lens 104a becomes away from the recording or reproducing position A100. Thereafter, when the cleaning member 111 passes the lens protector 104e, the objective lens 104a returns to the recording or reproducing position A100 by the elastic force of the suspension wires 104c. Thus, the cleaning member 111 and the objective lens 104a are brought into contact with each other.

With the structure described above, since the lens protector 104e is positioned in close proximity to the objective lens 104a, it is difficult to match the timing at which the cleaning member 111 arrives at above the objective lens 104a and the timing at which the objective lens 104a returns to the recording or reproducing position A100. Accordingly, particularly the portion positioned on the upstream side in the rotation direction X100 of the objective lens 104a may not fully be cleaned.

Further, since the lens protector 104e is provided on the upstream side in the rotation direction X100 relative to the objective lens 104a, dirt or dust in the device stirred up by the rotation of the optical disc 100 is prone to accumulate on the side portion of the lens protector 104e on the upstream side in the rotation direction X100. Accordingly, when the cleaning member 111 is brought into contact with the side portion of the lens protector 104e, dirt or dust accumulated on the lens protector 104e may attach to the cleaning member 111. When the cleaning member 111 to which dirt or dust is attached is brought into contact with the objective lens 104a, the cleaning member 111 cannot clean the grime off from the objective lens 104a. Even worse, the cleaning member 111 may grime the objective lens 104a.

Accordingly, an object of the present invention is to improve the issues described above, and to provide a lens cleaner and an optical disc device with which grime on the objective lens can more surely be cleaned off.

SUMMARY OF THE INVENTION

In order to achieve the object stated above, the present invention has the following structures.

According to a first aspect of the present invention, there is provided a lens cleaner which cleans an objective lens of an optical disc device, the optical disc device comprising:
a spindle motor which rotates a turntable attached an optical disc; and an optical head which emits light from the objective lens to the optical disc to perform recording or reproduction of information, the optical head comprising:

an elastic member which elastically holds the objective lens at a recording or reproducing position; and a lens protector which avoids contact between the optical disc and the objective lens, the lens protector being shiftable together with the objective lens and protruding toward the optical disc in close proximity to the objective lens and on an upstream side in a rotation direction of the turntable relative to the objective lens, wherein the lens cleaner has first and second lens cleaning portions, the first lens cleaning portion is provided so as to be brought into contact with the lens protector when the lens cleaner is attached onto the turntable and rotated, to cause the objective lens to be away from the recording or reproducing position against an elastic force of the elastic member, and the second lens cleaning portion is provided on the upstream side in the rotation direction relative to the first lens cleaning portion, the second lens cleaning portion being provided so as to pass above the lens protector while the objective lens is away from the recording or reproducing position by the first lens cleaning portion, and to be brought into contact with the objective lens when the objective lens returns to the recording or reproducing position by the elastic force of the elastic member.

According to a second aspect of the present invention, there is provided the lens cleaner according to the first aspect, wherein the lens cleaner is formed to be disc-like, and the first and second lens cleaning portions are provided on an identical circle about a rotation center of the lens cleaner.

According to a third aspect of the present invention, there is provided the lens cleaner according to one of the first and second aspects, wherein a width of the first lens cleaning portion in a direction crossing the rotation direction is smaller than a width of the second lens cleaning portion in a direction crossing the rotation direction.

According to a fourth aspect of the present invention, there is provided the lens cleaner according to one of the first to third aspects, wherein at least one of the first and second lens cleaning portions has a structure in which at least two cleaning members are arranged in parallel with the rotation direction.

According to a fifth aspect of the present invention, there is provided the lens cleaner according to the fourth aspect, wherein out of the two cleaning members, one cleaning member arranged on a downstream side in the rotation direction is harder than other cleaning member arranged on the upstream side in the rotation direction.

According to a sixth aspect of the present invention, there is provided an optical disc device, comprising an objective lens, wherein the objective lens is cleaned by the lens cleaner according to one of the first to fifth aspects.

According to a seventh aspect of the present invention, there is provided an optical disc device in which the objective lens is cleaned by the lens cleaner according to one of the first to fifth aspects, wherein the optical disc device further comprises a controller which emits light from the objective lens to the lens cleaner, which senses a change in a distance between the objective lens and the lens cleaner based on a change in an intensity of reflected light of the emitted light, and which controls a rotation speed of the turntable based on the change in the distance.

Since the lens cleaner of the present invention comprises the first and second lens cleaning portions, it becomes possible to more surely clean the grime off from the objective lens.

DETAILED DESCRIPTION OF THE EMBODIMENTS

Figure 1:
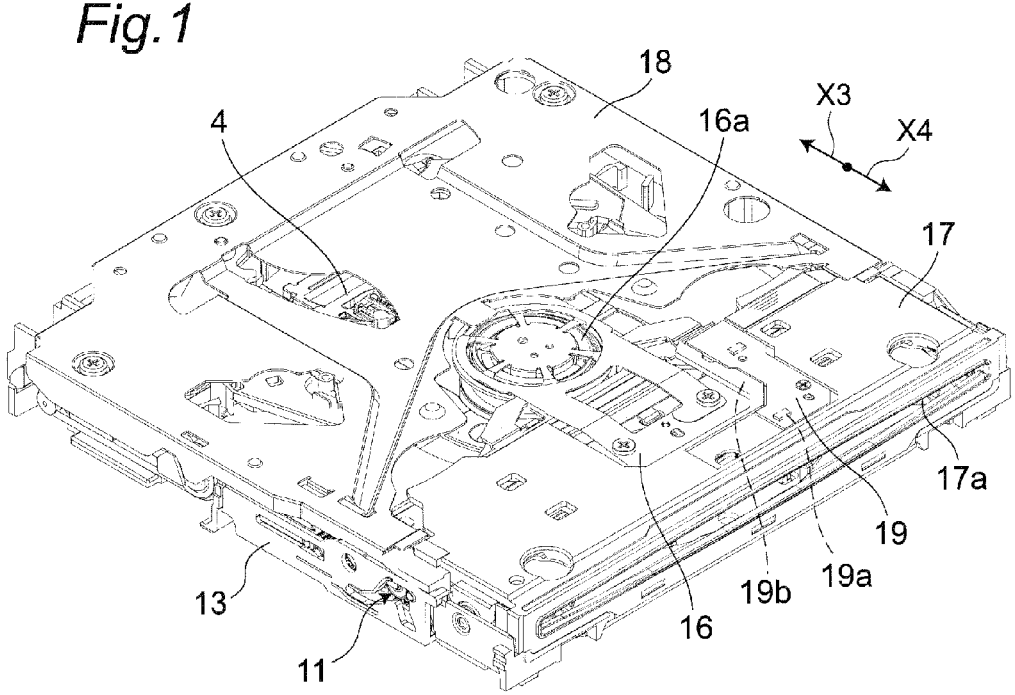
FIG. 1 is a perspective view of an optical disc device according to a first embodiment of the present invention as seen from diagonally above.

Before the description of the present invention proceeds, it is to be noted that like parts are designated by like reference numerals throughout the accompanying drawings.

In the following, with reference to the drawings, a description will be given of embodiments of the present invention.

First Embodiment

Figure 2:
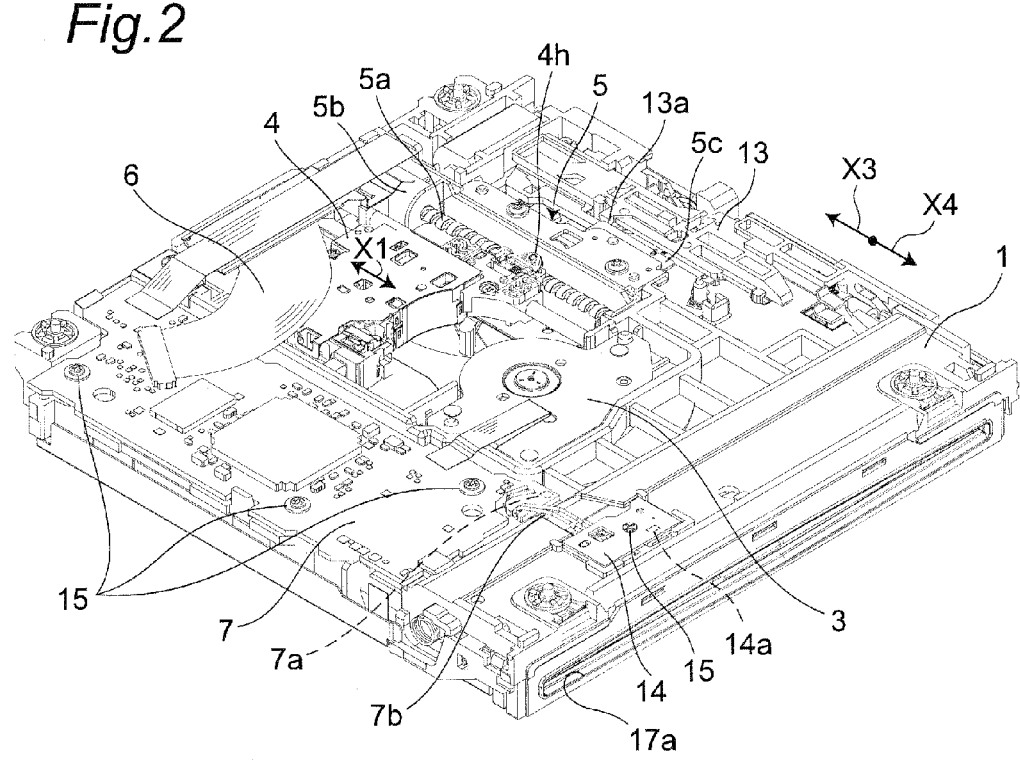
FIG. 2 is a perspective view of the optical disc device according to the first embodiment of the present invention as seen from diagonally below.
Figure 3:
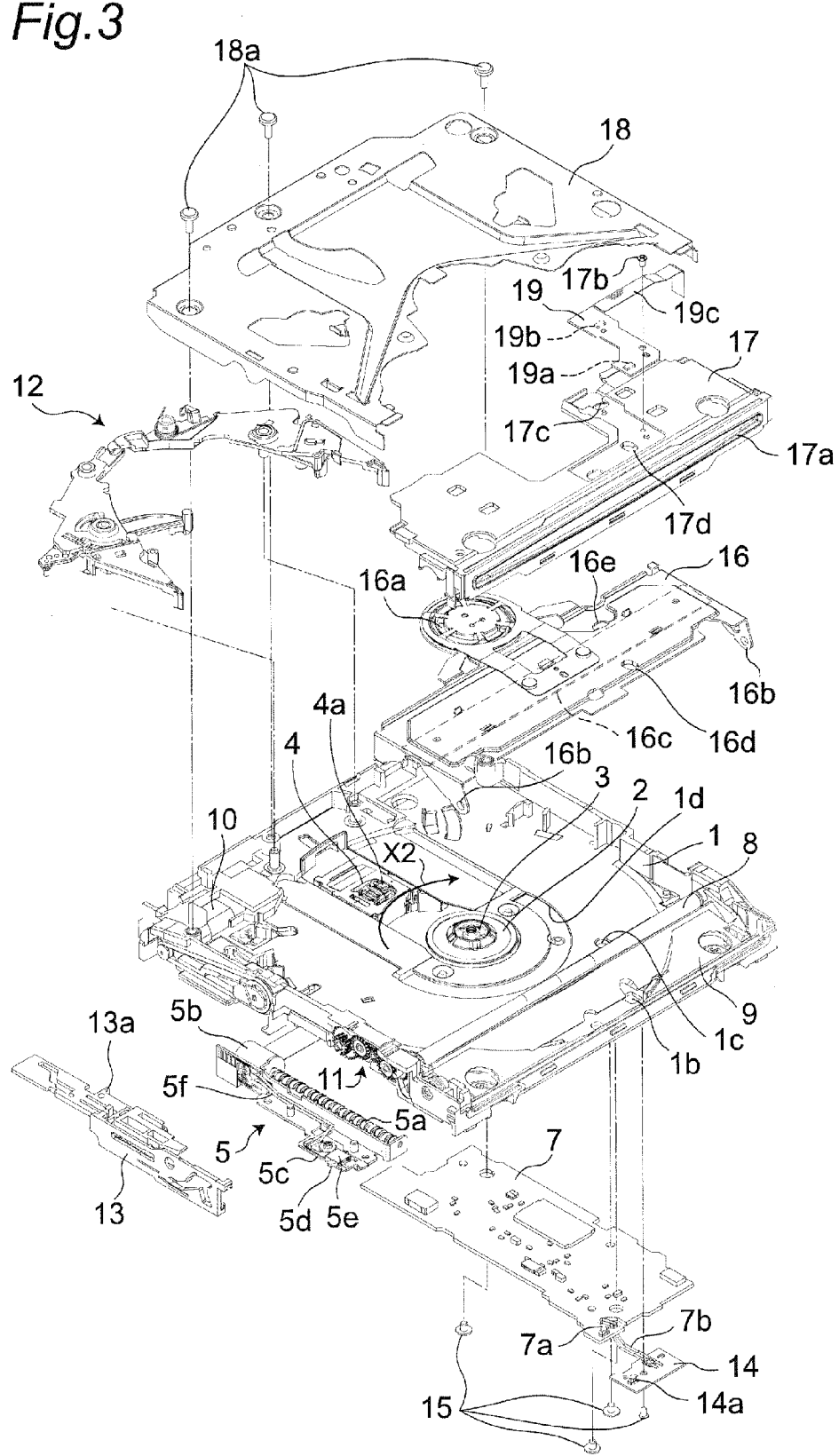
FIG. 3 is an exploded perspective view of the optical disc device according to the first embodiment of the present invention.
Figure 4:
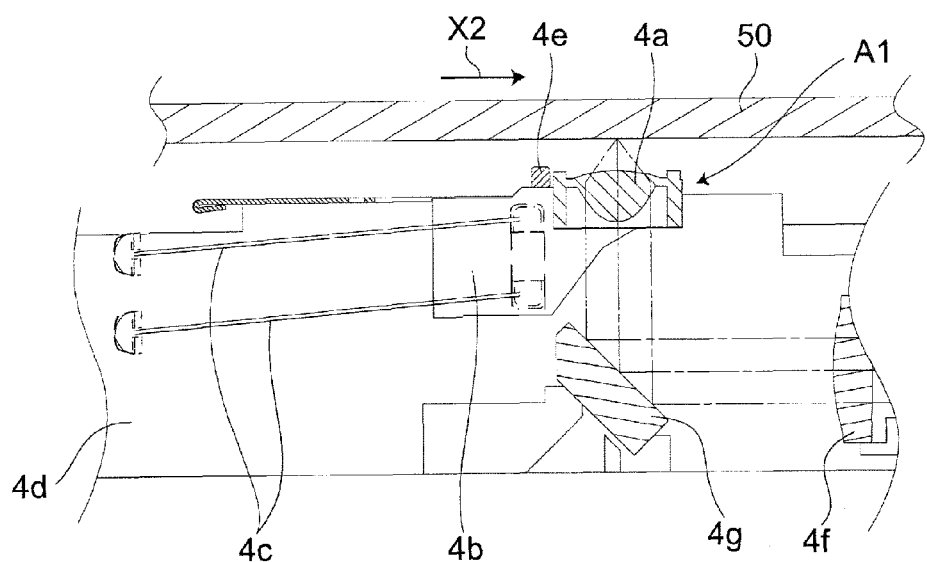
FIG. 4 is a perspective view of a lens cleaner according to the first embodiment of the present invention.

With reference to FIGS. 1 to 4, a description will be given of the overall structure of an optical disc device according to a first embodiment of the present invention. FIG. 1 is a perspective view of the optical disc device according to the first embodiment of the present invention as seen from diagonally above. FIG. 2 is a perspective view of the optical disc device as seen from diagonally below. FIG. 3 is an exploded perspective view of the optical disc device according to the first embodiment of the present invention. FIG. 4 is a partial enlarged schematic cross-sectional view of the optical disc device according to the first embodiment of the present invention when recording on or reproducing from an optical disc. It is noted that, for the sake of convenience, the description will proceed based on the premise that the top side of FIG. 1 is the top side of the optical disc device and the bottom side of FIG. 1 is the bottom side of the optical disc device. However, the present invention is not limited thereto. For example, the optical disc device may be arranged as being tilted by 90°.

The optical disc device according to the first embodiment is a slot-in scheme disc device that carries an optical disc 50 such as a CD or a DVD to the recording or reproducing position, without through the use of a tray. In FIGS. 1 to 3, the optical disc device according to the first embodiment includes a chassis (also referred to as a mechanical base) 1 that retains the components. The chassis 1 is provided with a spindle motor 3 that rotates a turntable 2 on which the optical disc 50 is placed, an optical head 4 that performs recording or reproduction of information on or from the optical disc 50, and an optical head carrying mechanism 5 that carries the optical head 4 in the radial direction (also referred to as the track direction) X1 with reference to the optical disc 50.

As shown in FIG. 4, the optical head 4 records information on the optical disc 50 by emitting light from an objective lens 4a to the optical disc 50 that is placed on the turntable 2 and rotates in the rotation direction X2 of the turntable 2. Further, the optical head 4 reproduces information recorded on the optical disc 50 by emitting light from the objective lens 4a to the rotating optical disc 50 to detect reflected light from the optical disc 50. As shown in FIG. 2, the optical head 4 is electrically connected to the drive substrate 7 via an FPC (flexible printed circuit board) 6. The drive substrate 7 is equipped with electronic components such as an LSI that controls operations such as carrying operation of the optical head 4.

The objective lens 4a is held by an actuator body 4b. The actuator body 4b is attached to one ends of a plurality of (e.g., four) suspension wires 4c. The other ends of the suspension wires 4c are attached to an optical base 4d serving as the shell of the optical head 4. The suspension wires 4c hold the actuator body 4b, thereby elastically holding the objective lens 4a at a recording or reproducing position A1 being the appropriate position for performing recording or reproduction of information on or from the optical disc 50.

Further, the optical head 4 is provided with a lens protector 4e so as to prevent the objective lens 4a from being brought into contact with the optical disc 50. The lens protector 4e is provided at the actuator body 4b so as to shift together with the objective lens 4a in an integrated manner. Further, the lens protector 4e is provided so as to project toward the optical disc 50 on the upstream side in the rotation direction X2 relative to the objective lens 4a.

It is noted that, though it is not particularly limited, in the first embodiment, the light emitted from the objective lens 4a is generated at a not-shown light generating unit. As represented by the alternate long and short dash line in FIG. 4, the light generated at the light generating unit passes through a lens 4f and is reflected from the reflecting mirror 4g, to enter the objective lens 4a.

The optical head carrying mechanism 5 is provided with a feed shaft 5a and a traverse motor 5b that rotates the feed shaft 5a. A spiral groove is formed at the feed shaft 5a, and a nut plate 4h integrally provided at the optical head 4 is fitted to the groove. As the traverse motor 5b rotates the feed shaft 5a, the nut plate 4h shifts in the longitudinal direction of the feed shaft 5a. Thus, the optical head 4 is carried in the radial direction X1. Further, the optical head carrying mechanism 5 includes a switch substrate 5c. The switch substrate 5c is equipped with a mechanical switch 5e having an actuator 5d. The mechanical switch 5e is electrically connected to the drive substrate 7 via a wire member 5f.

Further, the chassis 1 is provided with a roller lever 9 that rotatably holds a roller 8, a loading motor 10 that generates driving force for rotating the roller 8, and a gear group 11 that transmits the driving force of the loading motor 10 to the roller 8.

The gear group 11 is structured by a plurality of gears rotatably pivoted at the sidewall of the chassis 1. In the state where the optical disc 50 is brought into contact with the roller 8, by the roller 8 being rotated by the driving force of the loading motor 10 transmitted to the roller 8 via the gear group 11, the optical disc 50 is carried in the disc carrying directions X3 and X4.

Further, the chassis 1 is provided with a lever group 12 structured by a plurality of levers, and a cam rod 13.

The lever group 12 is brought into contact with an outer edge portion of the optical disc 50 carried into the device, thereby guiding the optical disc 50 such that the central hole of the optical disc 50 is positioned in close proximity to the turntable 2. Further, when the central hole of the optical disc 50 is positioned in close proximity to the turntable 2, the lever group 12 shifts the cam rod 13 in the disc ejecting direction X4 via a not-shown trigger member. In the following, such a shifting of the cam rod 13 is referred to as the "initial shift".

The cam rod 13 is provided so as to be shiftable in the disc carrying directions X3 and X4 relative to the chassis 1. When the cam rod 13 is initially shifted by the lever group 12, a rack (not shown) provided to the cam rod 13 meshes with one of the gears out of the gear group 11. In this state, the driving force of the loading motor 10 is transmitted to the gear group 11, and the rotation of the gears of the gear group 11 causes the cam rod 13 to further shift in the disc ejecting direction X4. Using the shifting force of the cam rod 13, a clamp lever 16 whose description will follow rotates, whereby the optical disc 50 is attached onto the turntable 2, and the roller lever 9 rotates to cause the roller 8 to leave the optical disc 50. Thus, it becomes possible to rotate the optical disc 50, to perform the recording or reproduction of information to or from the optical disc 50.

Further, the cam rod 13 is provided with a rib 13a that can be brought into contact with the actuator 5d of the mechanical switch 5e. When the cam rod 13 shifts in the disc ejecting direction X4 by the rotation of the gears of the gear group 11, the rib 13a is brought into contact with the actuator 5d, whereby the actuator 5d enters ON state (i.e., the electrically short-circuited state). It is noted that, when the rib 13a is not in contact with the actuator 5d, the actuator 5d is in OFF state. The information of ON/OFF state of the actuator 5d is transmitted to the drive substrate 7 via the wire member 5d.

The drive substrate 7 is equipped with a light receiving element 7a of a transmission-type photo interrupter detecting that the optical disc 50 is ejected to a disc insert slit 17a. Further, to the drive substrate 7, a sensor substrate 14 is connected via a wire member 7b. The sensor substrate 14 is equipped with a light receiving element 14a of a transmission-type photo interrupter detecting that the optical disc 50 is inserted into the disc insert slit 17a. The drive substrate 7 and the sensor substrate 14 are fixed to the bottom face of the chassis 1 by a plurality of screws 15.

Further, the chassis 1 is provided with the clamp lever 16, a cover 17, and a sub-base 18.

The clamp lever 16 rotatably holds a clamper 16a that clamps the optical disc 50 onto the turntable 2. Further, the clamp lever 16 is provided so as to be rotatable about holes 16b provided at respective opposite ends on the upstream side in the disc insert direction X3. When the optical disc 50 is carried so that the central hole of the optical disc 50 is positioned in close proximity to the turntable 2 and the cam rod 13 shifts in the disc ejecting direction X4 by the rotation of the gears of the gear group 11, the cam rod 13 and the clamp lever 16 engage with each other, and the clamp lever 16 rotates. By the rotation of the clamp lever 16, the clamper 16a clamps the optical disc 50 onto the turntable 2. It is noted that, by the clamp lever 16 being rotated from this state in the reverse direction, the clamped state of the optical disc 50 by the clamper 16a is released. Then, the clamper 16a recedes so that the clamper 16a will not be brought into contact with the optical disc 50 while the optical disc 50 is carried.

At the bottom face of the clamp lever 16, a guide member 16c that guides carrying of the optical disc 50 in the carrying directions X3 and X4 is provided. The optical disc 50 is carried in the carrying directions X3 and X4, by the rotation of the roller 8 in the state where the optical disc 50 is interposed between the roller 8 and the guide member 16c.

The cover 17 is provided at a higher level than the clamp lever 16. The cover 17 is provided with the disc insert slit 17a into and from which the optical disc 50 is inserted and ejected. At the top face of the cover 17, a sensor substrate 19 is fixed by a screw 17b.

The sensor substrate 19 is equipped with a light emitting element 19a of a transmission-type photo interrupter at the position opposing to the light receiving element 14a of the sensor substrate 14. Further, the sensor substrate 19 is equipped with a light emitting element 19b of a transmission-type photo interrupter at the position opposing to the light receiving element 7a of the drive substrate 7.

At the cover 17, the clamp lever 16, and the chassis 1, through holes 17d, 16d, and 1b are respectively formed so that the light of the light emitting element 19a is received by the light receiving element 14a. Further, at the cover 17, the clamp lever 16, and the chassis 1, through holes 17c, 16e, and 1c are respectively provided so that the light of the light emitting element 19b is received by the light receiving element 7a.

In the following, the transmission-type photo interrupters respectively structured by the light receiving element 14a and the light emitting element 19a are referred to as the F sensors (F stands for front) 14a and 19a. Further, the transmission-type photo interrupters respectively structured by the light receiving element 7a and the light emitting element 19b are referred to as B sensors (B stands for back) 7a and 19b.

When the light receiving element 14a receives the light of the light emitting element 19a, the F sensors 14a and 19a are in OFF state. Further, when the light receiving element 14a does not receive the light of the light emitting element 19a because of, for example, the optical disc 50 being positioned between the light receiving element 14a and the light emitting element 19a, the F sensors 14a and 19a are in ON state. Similarly, when the light receiving element 7a receives the light of the light emitting element 19b, the B sensors 7a and 19b are in OFF state. Further, when the light receiving element 7a does not receive the light from the light emitting element 19b because of, for example, the optical disc 50 being positioned between the light receiving element 7a and the light emitting element 19b, the B sensors 7a and 19b are in ON state.

Further, the sensor substrate 19 is electrically connected to the drive substrate 7 via the FFC (flexible flat cable) 19c. The information of ON/OFF state of the F sensors 14a and 19a and the B sensor 7a and 19b is transmitted to the drive substrate 7 via the FFC 19c and the wire member 7b.

The sub-base 18 is provided at a level higher than the lever group 12, and is fixed to the chassis 1 by a plurality of screws 18a. The center portion of the sub-base 18 serves as the guide of the optical disc 50 when the optical disc 50 is carried.

Figure 5:
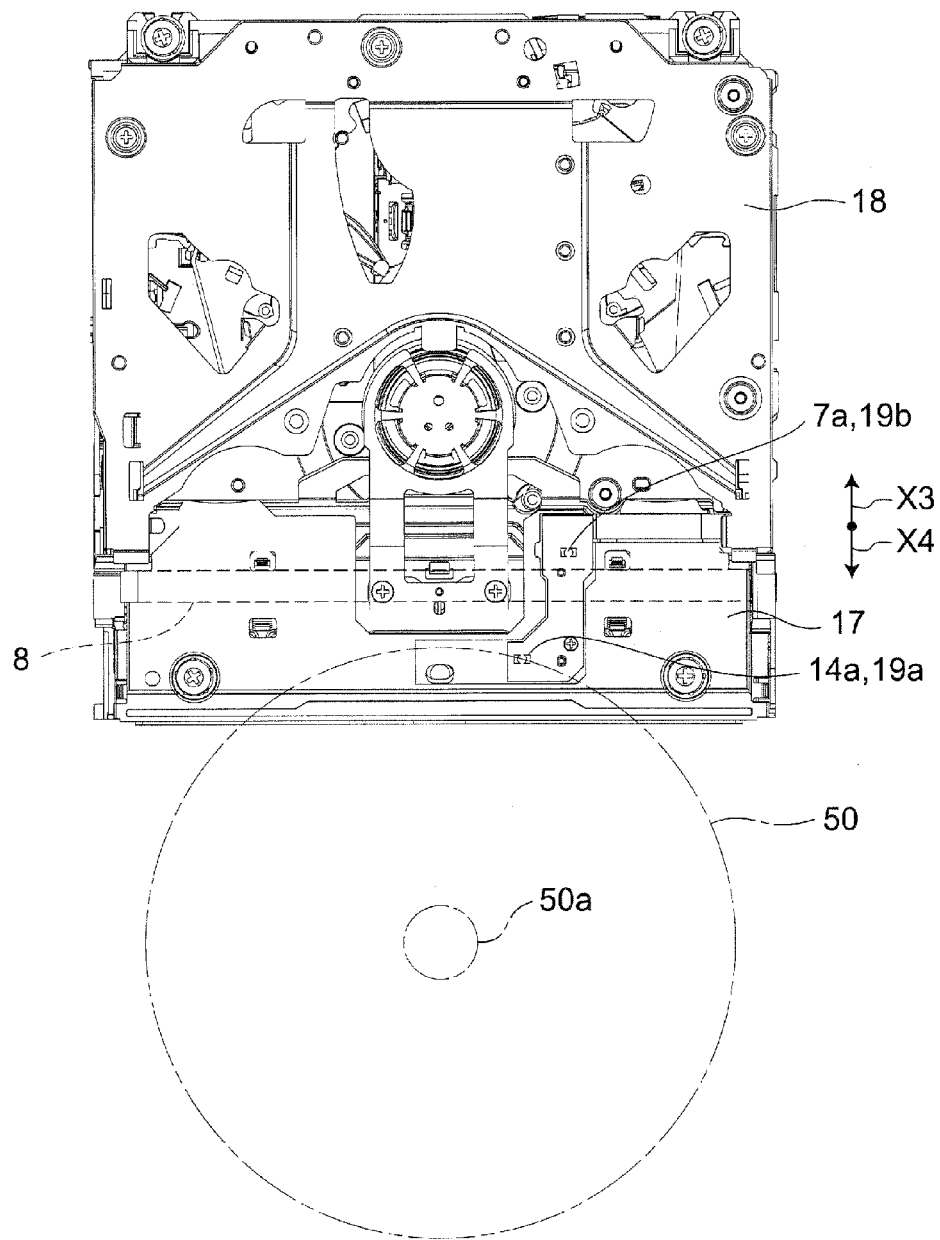
FIG. 5 is a top view of the optical disc device according to the first embodiment of the present invention, showing the state of components when an F sensor detects that an optical disc is inserted into a disc insert slit.
Figure 6:
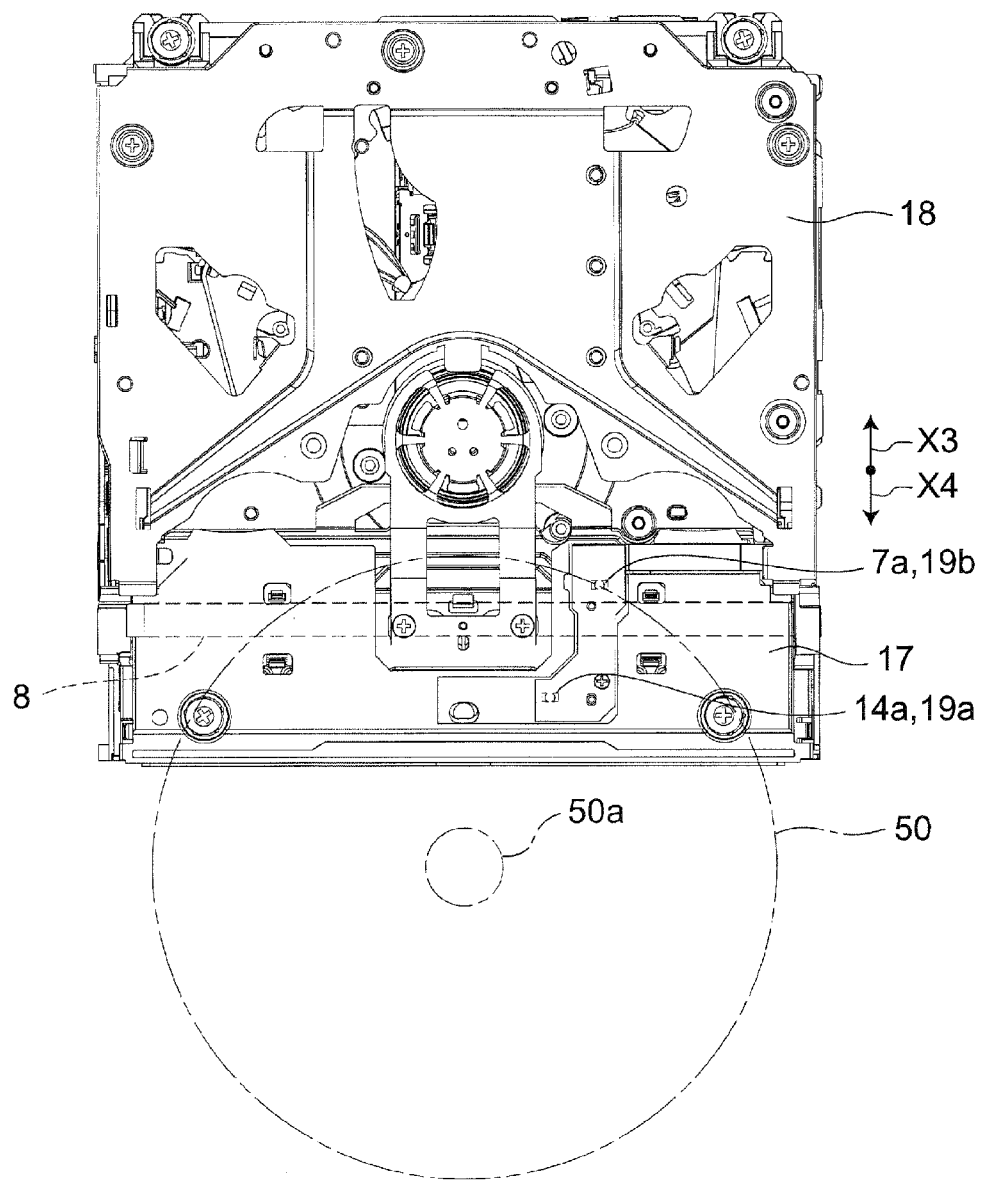
FIG. 6 is a top view of the optical disc device according to the first embodiment of the present invention, showing the state of components when a B sensor detects that the optical disc is ejected from the disc insert slit.

Next, with reference to FIGS. 1 to 3, 5, and 6, a description will be given of the optical disc 50 carry-in and eject operation of the optical disc device according to the first embodiment. FIG. 5 is a top view showing the state of the components when the F sensors 14a and 19a detect that the optical disc 50 is inserted into the disc insert slit 17a. FIG. 6 is a top view showing the state of the components when the B sensors 7a and 19b detect that the optical disc 50 is ejected to the disc insert slit 17a.

It is noted that, the operations of the optical disc device are controlled by electronic components such as an LSI that is installed in the drive substrate 7 and that functions as the controller. Further, in connection with the optical disc 50, it is widely known that there are the large-diameter disc whose standard diameter is 12 cm and the small-diameter disc whose standard diameter is 8 cm. Here, for the sake of convenience, the description is given based on the premise that the optical disc 50 is the large-diameter disc. However, the present invention is not limited thereto.

First, a description will be given of a carry-in operation of the optical disc 50.

When the optical disc 50 is inserted into the disc insert slit 17a and the optical disc 50 arrives at the position opposing to the F sensors 14a and 19a (see FIG. 5), the F sensors 14a and 19a enter ON state. Thus, the loading motor 10 is driven, and the driving force of the loading motor 10 is transmitted to the roller 8 via the gear group 11, whereby the roller 8 rotates. In this state, when the optical disc 50 is further inserted, the optical disc 50 is held between the roller 8 and the guide member 16c of the clamp lever 16, and is carried in the disc carry-in direction X3.

When the optical disc 50 is carried in the disc carry-in direction X3, the outer edge portion of the optical disc 50 is brought into contact with the lever group 12, and the optical disc 50 is guided by the lever group 12 so that the central hole 50*a* is positioned in the close proximity to the turntable 2.

When the central hole 50*a* of the optical disc 50 shifts to close proximity to the turntable 2, the lever group 12 causes the cam rod 13 to perform the initial shift. By the initial shift, the rack of the cam rod 13 meshes with one of the gears out of the gear group 11 rotated by the driving force of the loading motor 10, and then the cam rod 13 further shifts in the disc ejecting direction X4.

By the shifting of the cam rod 13, the clamp lever 16 rotates and the optical disc 50 is attached onto the turntable 2, and the roller lever 9 rotates and the roller 8 leaves the optical disc 50. Further, at this timing, the rib 13*a* of the cam rod 13 is brought into contact with the actuator 5*d* of the mechanical switch 5*e*, whereby the mechanical switch 5*e* enters ON state. Thus, the spindle motor 3 is driven to rotate the turntable 2, and recording or reproduction of information on or from the optical disc 50 is performed.

Next, a description will be given of the eject operation of the optical disc 50.

When start of the eject operation of the optical disc 50 is instructed by, e.g., the eject button (not shown) being pushed, the loading motor 10 is driven in the direction which is reverse to that in the carry-in mode. The reverse driving force of the loading motor 10 is transmitted to the roller 8 via the gear group 11, and the roller 8 rotates in the reverse direction. Further, the cam rod 13 shifts in the disc insert direction X3 by the gear group 11 that rotates in the reverse direction by the reverse driving force of the loading motor 10. By the shifting of the cam rod 13 in the disc insert direction X3, the rib 13*a* of the cam rod 13 and the actuator 5*d* of the mechanical switch 5*e* become away from each other, and the mechanical switch 5*e* enters OFF state. Further, by the shifting of the cam rod 13 in the disc insert direction X3, the clamp lever 16 rotates in the reverse direction, whereby the attached state of the optical disc 50 onto the turntable 2 is released and the roller lever 9 rotates in the reverse direction, whereby the roller 8 is brought into contact with the optical disc 50. Thus, the optical disc 50 receives the rotation force of the roller 8 in the reverse direction and is carried in the disc ejecting direction X4.

When the optical disc 50 passes through the position where the optical disc 50 opposes to the B sensors 7*a* and 19*b* (see FIG. 6), the B sensors 7*a* and 19*b* enter OFF state because the light is not blocked by the optical disc 50. Thus, driving of the loading motor 10 in the reverse direction stops, and the reverse rotation of the roller 8 stops. As a result, the optical disc 50 is held in the state held by the roller 8 and the guide member 16*c* of the clamp lever 16 therebetween, at the slightly overrun position from the position where the B sensors 7*a* and 19*b* have entered OFF state.

Figure 7:
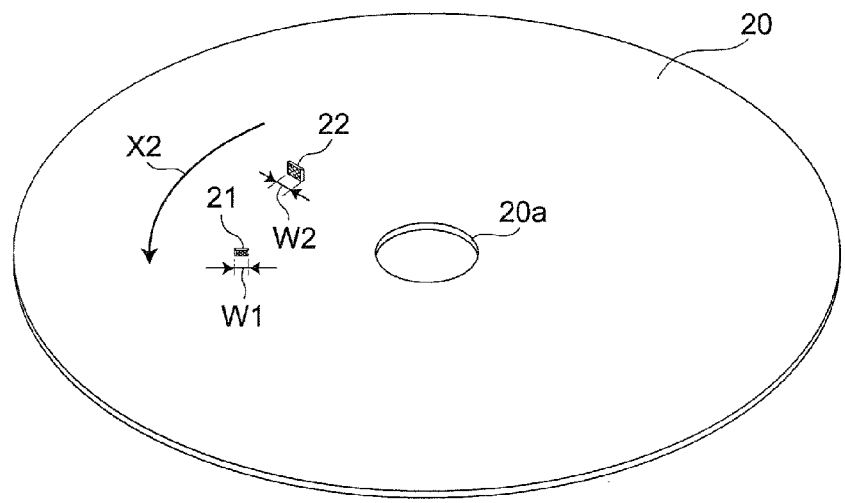
FIG. 7 is a perspective view of the lens cleaner according to the first embodiment of the present invention.

Next, with reference to FIGS. 7 and 8, a description will be given of the schematic structure of the lens cleaner 20 that cleans the objective lens 4*a* of the optical head 4. FIG. 7 is a perspective view of the lens cleaner 20, and FIG. 8 is a plan view of the lens cleaner 20.

In FIG. 7, the lens cleaner 20 is formed to be disc-like. Though it is not particularly limited, in the first embodiment, the lens cleaner 20 is formed to be substantially identical to the large-diameter disc in shape and size. Accordingly, the lens cleaner 20 can be carried in and ejected from the optical disc device in the similar manner as the optical disc 50. The lens cleaner 20 is provided with a central hole 20*a*. Further, on the surface of the lens cleaner 20, a first lens cleaning portion 21 and a second lens cleaning portion 22 that clean the objective lens 4*a* are provided.

Figure 8:
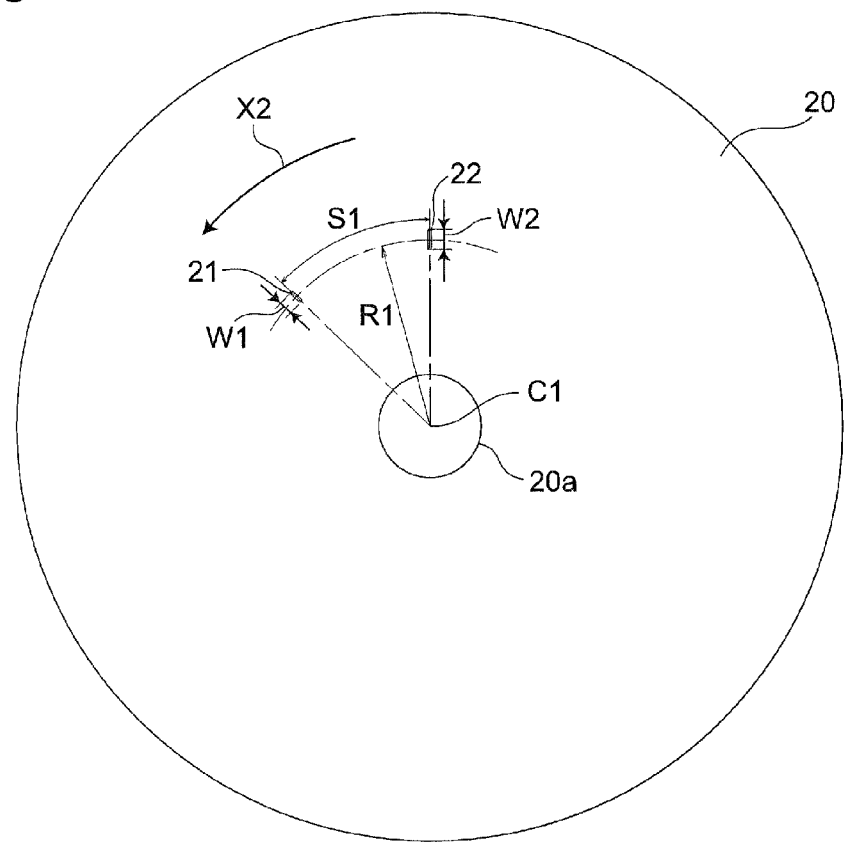
FIG. 8 is a plan view of the lens cleaner according to the first embodiment of the present invention.

As shown in FIG. 8, the first and second lens cleaning portions 21 and 22 are provided on an identical circle about the rotation center C1 of the lens cleaner 20. The radius R1 of the circle is 27 mm, for example.

Further, the second lens cleaning portion 22 is provided on the upstream side in the rotation direction X2 relative to the first lens cleaning portion 21. That is, the second lens cleaning portion 22 is provided at the position so as to pass a particular point after the first lens cleaning portion 21 has passed the particular point, in the case where the lens cleaner 20 is rotated in the rotation direction X2. The first lens cleaning portion 21 and the second lens cleaning portion 22 are arranged such that, for example, a straight line that passes through the rotation center C1 and a first lens cleaning portion 21 and the straight line that passes through the rotation center C1 and the second lens cleaning portion 22 forms an angle of 63 degrees.

Further, the first lens cleaning portion 21 is formed such that a width W1 in the direction crossing the rotation direction X2 (i.e., the radial direction) becomes smaller than a width W2 of the second lens cleaning portion 22 in the direction crossing the rotation direction X2. The width W1 of the first lens cleaning portion 21 is, e.g., 1 mm, and the width W2 of the second lens cleaning portion 22 is, e.g., 2 mm.

The first and second lens cleaning portions 21 and 22 are structured by, for example, a nonwoven fabric or the like. The root portion of each of the first and second lens cleaning portions 21 and 22 is inserted into a recess provided at the surface of the lens cleaner 20, and is fixed by an adhesive or the like. It is noted that, the root portion of each of the first and second lens cleaning portions 21 and 22 may be fixed to the lens cleaner 20 through other methods.

Figure 9:
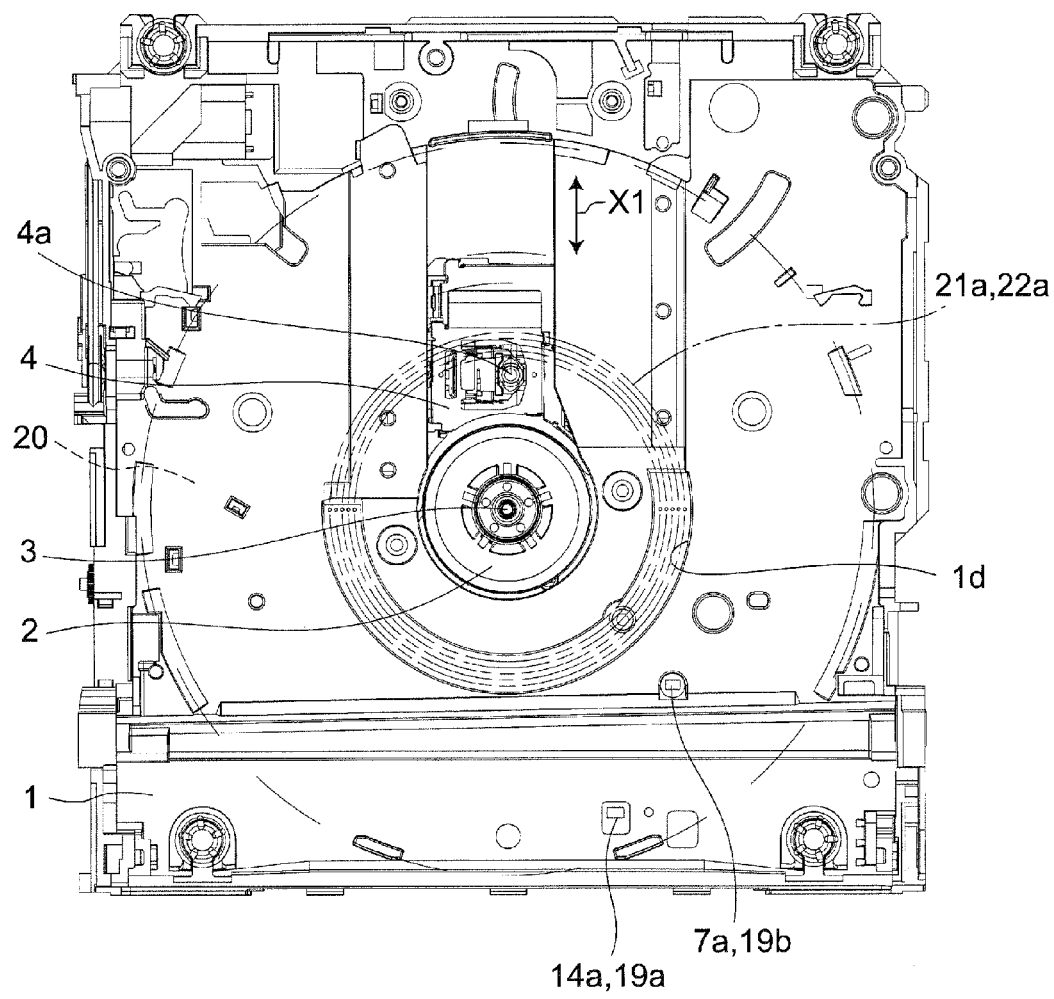
FIG. 9 is a plan view showing the state where the lens cleaner shown in FIG. 7 is attached onto a turntable, and where first and second lens cleaning portions and an objective lens are not brought into contact with each other.
Figure 10:
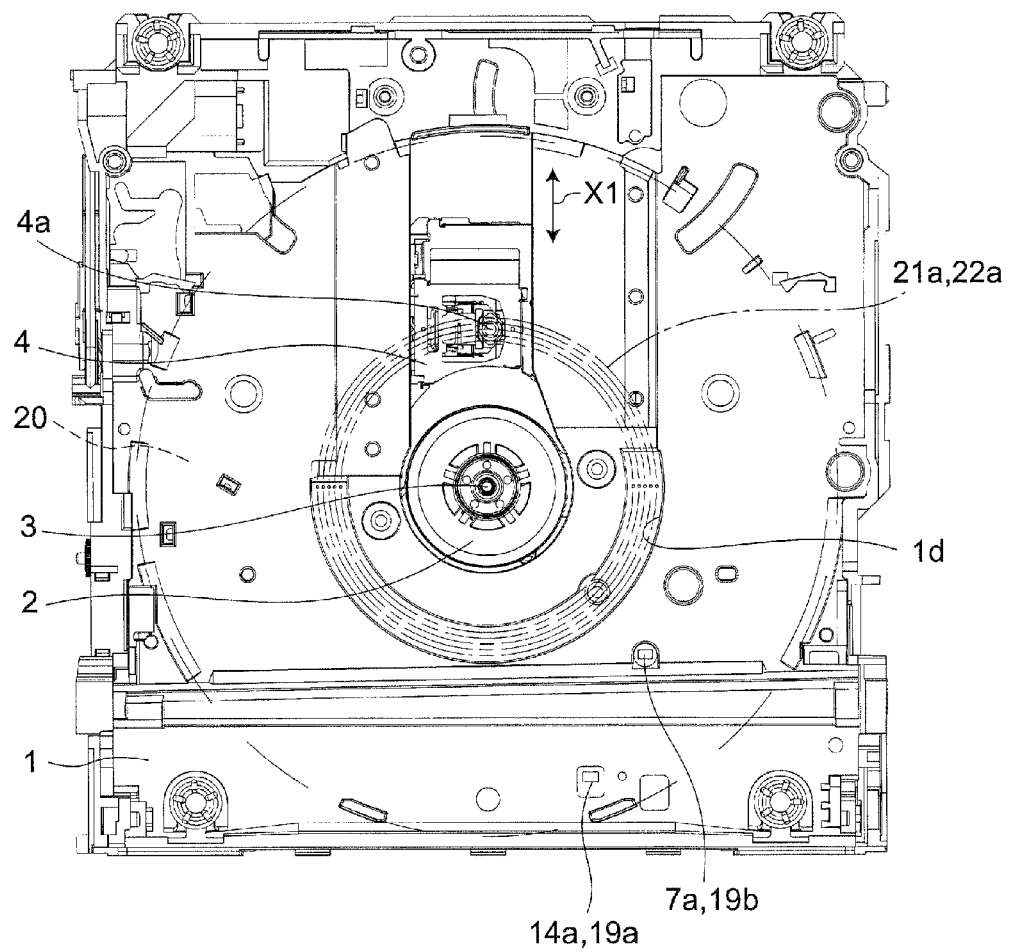
FIG. 10 is a plan view showing the state where the lens cleaner shown in FIG. 7 is attached onto the turntable, and where the first and second lens cleaning portions and the objective lens are brought into contact with each other.
Figure 15:
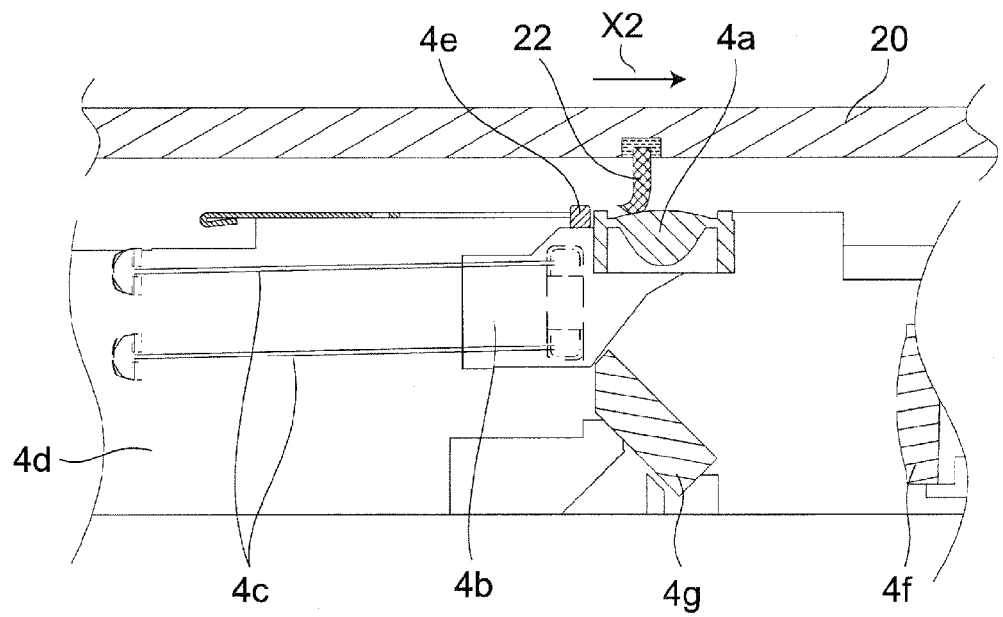
FIG. 15 is a cross-sectional view schematically showing the manner of the lens cleaner shown in FIG. 7 cleaning the objective lens of the optical head.
Figure 16:
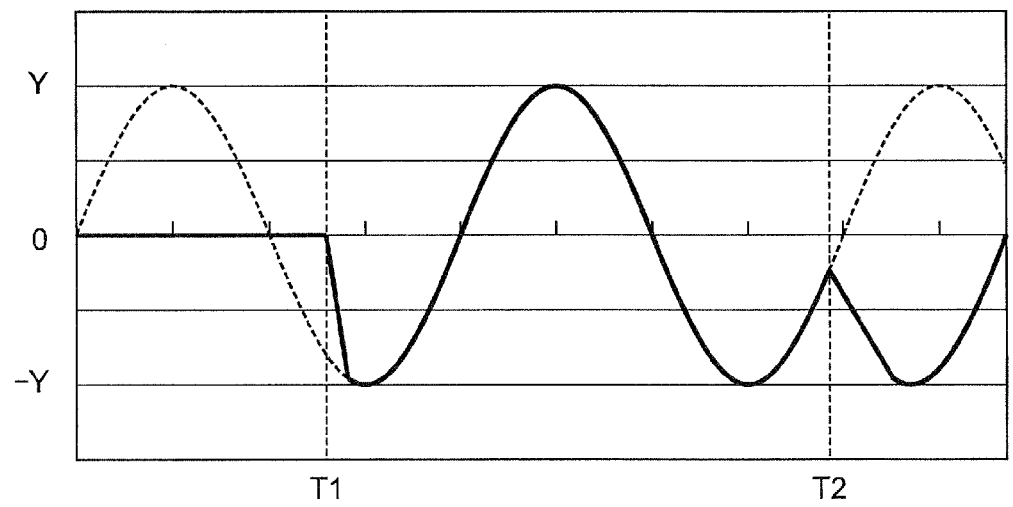
FIG. 16 is a graph showing the positional displacement in the top-bottom direction of the objective lens when the cleaning operation is performed by the lens cleaner shown in FIG. 7.

Next, with reference to FIGS. 9 to 16, a description will be given of the cleaning operation to the objective lens 4*a* of the optical head 4 performed by the lens cleaner 20. FIGS. 9 and 10 are each a plan view showing the state where the lens cleaner 20 is attached onto the turntable 2. FIG. 9 shows the state where the first and second lens cleaning portions 21 and 22 and the objective lens 4*a* are not brought into contact with each other. FIG. 10 shows the state where the first and second lens cleaning portions 21 and 22 and the objective lens 4*a* are brought into contact with each other. FIGS. 11 to 15 are each a cross-sectional view schematically showing the manner of the lens cleaner 20 cleaning the objective lens 4*a* of the optical head 4. FIG. 16 is a graph representing the positional displacement in the top-bottom direction of the objective lens 4*a* when the lens cleaner 20 performs the cleaning operation. The vertical axis in FIG. 16 represents the distance from the recording or reproducing position A1, and the horizontal axis in FIG. 16 represents the time from the start of the cleaning operation.

When the lens cleaner 20 is attached onto the turntable 2 in the similar manner as the optical disc 50 and the mechanical switch 5*e* switches from OFF state to ON state, the spindle motor 3 is driven to rotate the turntable 2 in the rotation direction X2. At this time, as shown in FIG. 9, the objective lens 4*a* of the optical head 4 is positioned to be away from the rotation tracks 21*a* and 22*a* of the first and second lens cleaning portions 21 and 22 of the lens cleaner 20. It is noted that, the chassis 1 is provided with a groove 1*d* for avoiding contact with the first and second lens cleaning portions 21 and 22 at the position opposing to the rotation tracks 21*a* and 22*a* of the first and second lens cleaning portions 21 and 22.

Figure 11:
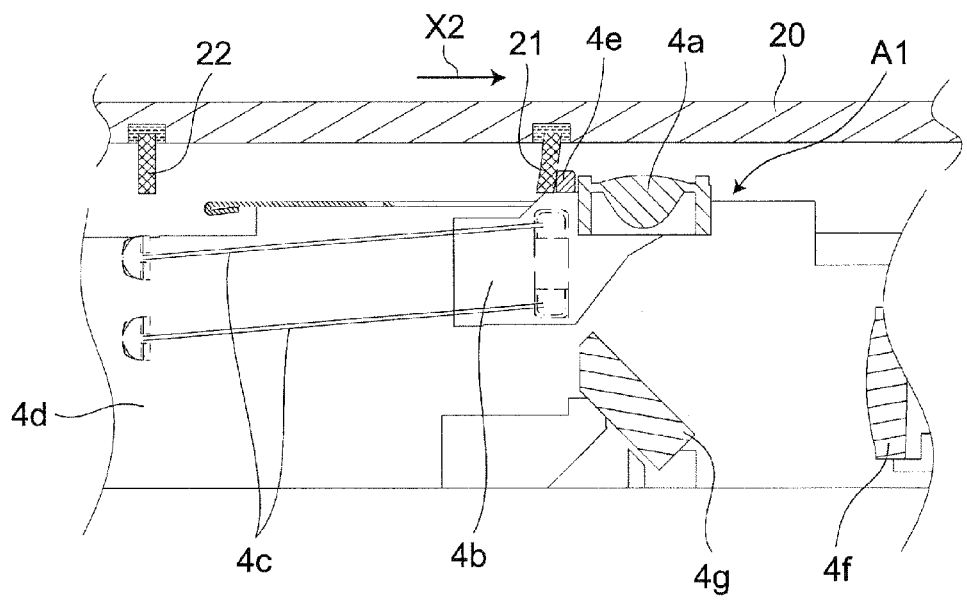
FIG. 11 is a cross-sectional view schematically showing the manner of the lens cleaner shown in FIG. 7 cleaning the objective lens of an optical head.

When the rotation speed of the lens cleaner 20 attached onto the turntable 2 reaches a prescribed speed (e.g., 500 rpm), the traverse motor 5*b* is driven and the feed shaft 5*a* rotates (see FIG. 2). This allows the optical head 4 to shift in the radial direction X1, and as shown in FIG. 10, the objective lens 4a shifts onto the rotation tracks 21a and 22a of the first and second lens cleaning portions 21 and 22. By the shifting, as shown in FIG. 11, the first lens cleaning portion 21 is brought into contact with the lens protector 4e. This timing at which the first lens cleaning portion 21 is brought into contact with the lens protector 4e is the timing T1 shown in FIG. 16.

It is noted that, the distance between the objective lens 4a at the recording or reproducing position A1 and the lens cleaner 20 is, for example, 0.5 mm, and the height of the first and second lens cleaning portions 21 and 22 is, for example, 1.5 mm.

When the lens cleaner 20 further rotates from the state shown in FIG. 11 in the rotation direction X2, the first lens cleaning portion 21 pushes down the lens protector 4e against the elastic force of the suspension wires 4c, to pass above the lens protector 4e. At this time, the objective lens 4a leaves the recording or reproducing position A1.

When the first lens cleaning portion 21 passes above the lens protector 4e, since the objective lens 4a is elastically held by the suspension wires 4c in a cantilever manner, as shown in FIG. 16, the objective lens 4a freely vibrates in the top-bottom direction (the thickness direction of the device) at a specific amplitude Y (e.g., 1.2 mm) and a specific frequency (e.g., 62.5 Hz). That is, the objective lens 4a repeatedly lowers and rises as shown in FIGS. 12 to 15.

Figure 12:
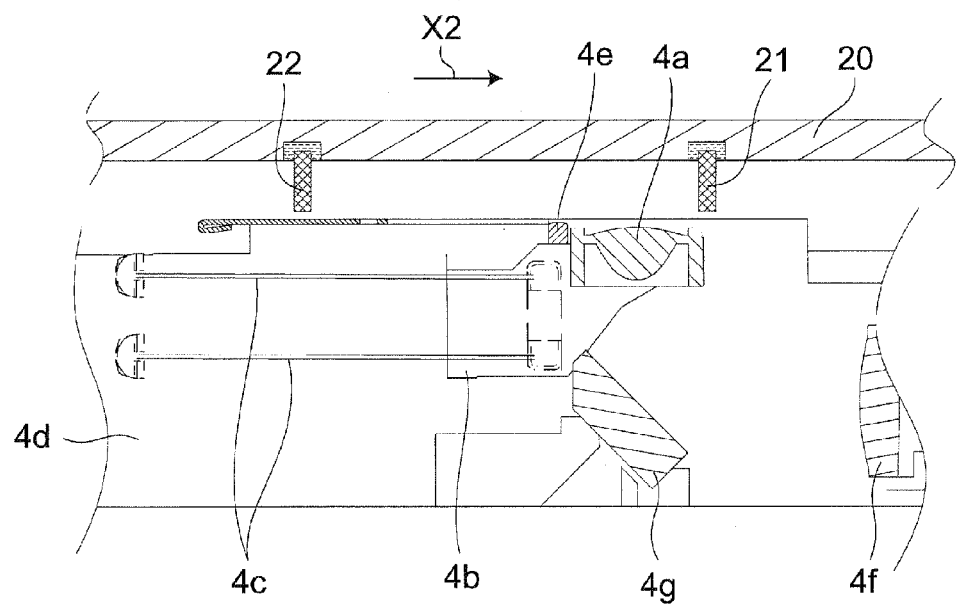
FIG. 12 is a cross-sectional view schematically showing the manner of the lens cleaner shown in FIG. 7 cleaning the objective lens of the optical head.
Figure 13:
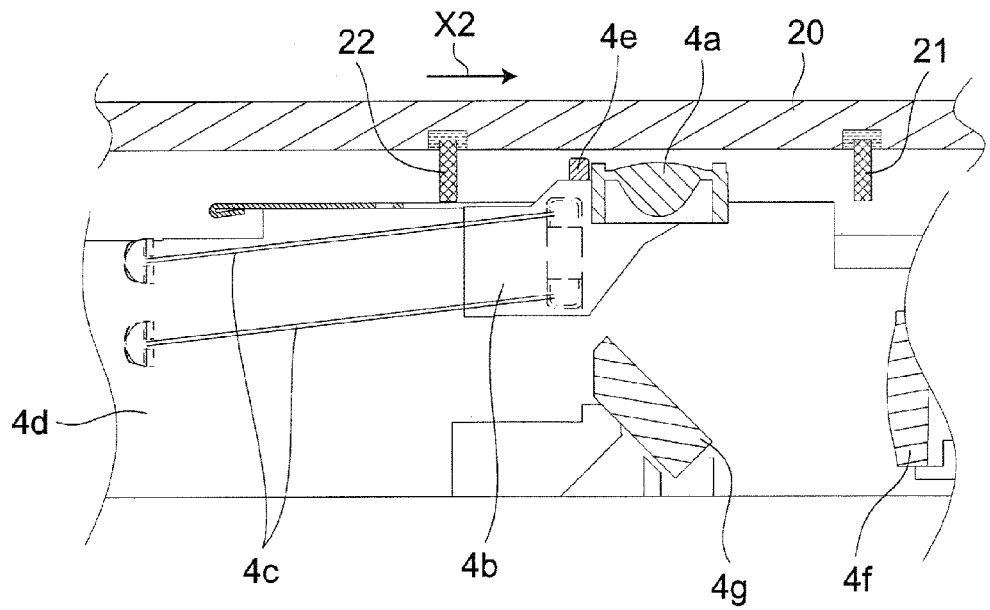
FIG. 13 is a cross-sectional view schematically showing the manner of the lens cleaner shown in FIG. 7 cleaning the objective lens of the optical head.

As shown in FIG. 12, the first lens cleaning portion 21 passes above the objective lens 4a while the objective lens 4a is at the low level. Thereafter, the objective lens 4a rises as shown in FIG. 13, and thereafter lowers as shown in FIG. 14.

Figure 14:
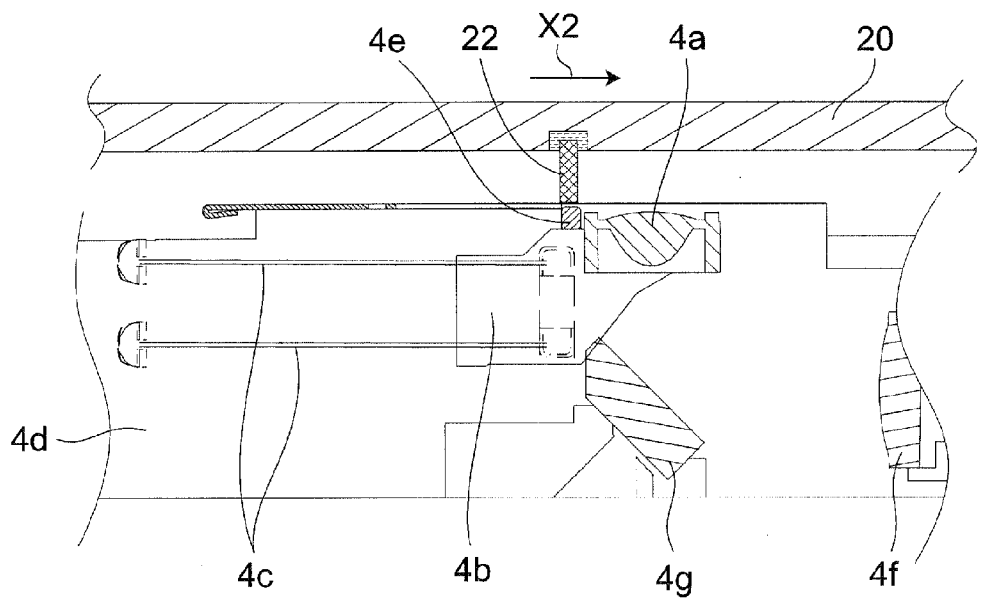
FIG. 14 is a cross-sectional view schematically showing the manner of the lens cleaner shown in FIG. 7 cleaning the objective lens of the optical head.

As shown in FIG. 14, when the objective lens 4a lowers, the second lens cleaning portion 22 passes above the lens protector 4e without being brought into contact with the lens protector 4e. Thereafter, the objective lens 4a rises as shown in FIG. 15, and is brought into contact with the second lens cleaning portion 22. The timing at which the second lens cleaning portion 22 is brought into contact with the objective lens 4a is the timing T2 shown in FIG. 16. By the second lens cleaning portion 22 being brought into contact with the objective lens 4a, the objective lens 4a is cleaned. Thereafter, by the objective lens 4a being brought into contact with the second lens cleaning portion 22, the objective lens 4a lowers against the elastic force of the suspension wires 4c as shown in FIG. 16, and freely vibrates at a particular amplitude Y and a particular frequency (e.g., 62.5 Hz). After the vibration ceases, the lens protector 4e is again brought into contact with the first lens cleaning portion 21 as shown in FIG. 11. Thereafter, the operation as described above is repeated.

It is noted that, the vibration frequency and amplitude of the objective lens 4a can be adjusted by adjusting the diameter and length of the suspension wires 4c, the weight of the actuator body 4b, and the like.

With the lens cleaner 20 according to the first embodiment, since the first lens cleaning portion 21 that allows the objective lens 4a to be away from the recording or reproducing position A1 and the second lens cleaning portion 22 that cleans the objective lens 4a are separately provided, it is easy to provide the timing at which the portion of the objective lens 4a on the upstream side in the rotation direction X2 is brought into contact with the second lens cleaning portion 22. Further, since the first lens cleaning portion 21 makes it possible for the second lens cleaning portion 22 to pass above the lens protector 21 while the objective lens 4a is away from the recording or reproducing position A1, the dirt or dust accumulated on the side portion of the lens protector 4e will not attach to the second lens cleaning portion 22. Accordingly, by the second lens cleaning portion 22, the grime on the objective lens 4a can more surely be cleaned.

Further, with the lens cleaner 20 according to the first embodiment, since the width W1 of the first lens cleaning portion 21 is set to be smaller than the width W2 of the second lens cleaning portion 22, even when dirt or dust accumulated on the side portion of the lens protector 4e attaches to the first lens cleaning portion 21 and the first lens cleaning portion 21 is brought into contact with the objective lens 4a, the objective lens 4a can be prevented from being further grimed. Further, since the width W2 of the second lens cleaning portion 22 is greater than the width W1 of the first lens cleaning portion 21, the objective lens 4a can be cleaned in a wider range.

Second Embodiment

Figure 17:
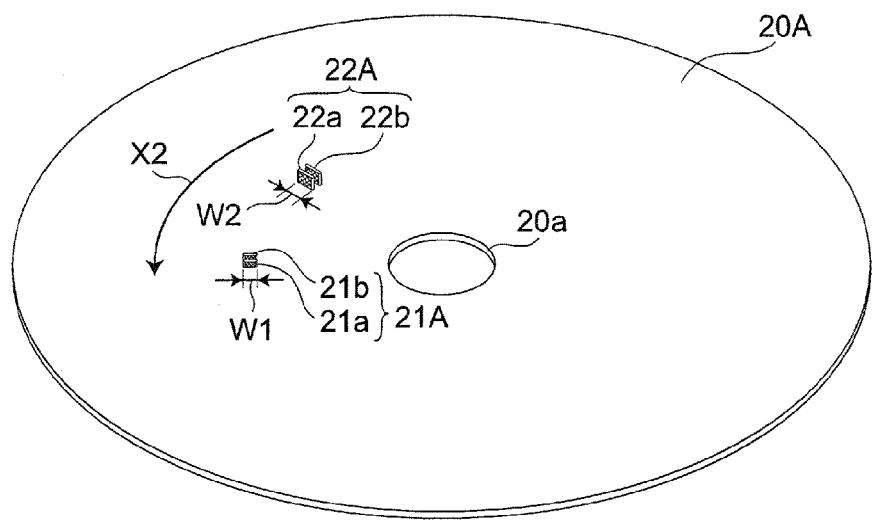
FIG. 17 is a perspective view of a lens cleaner according to a second embodiment of the present invention.
Figure 18:
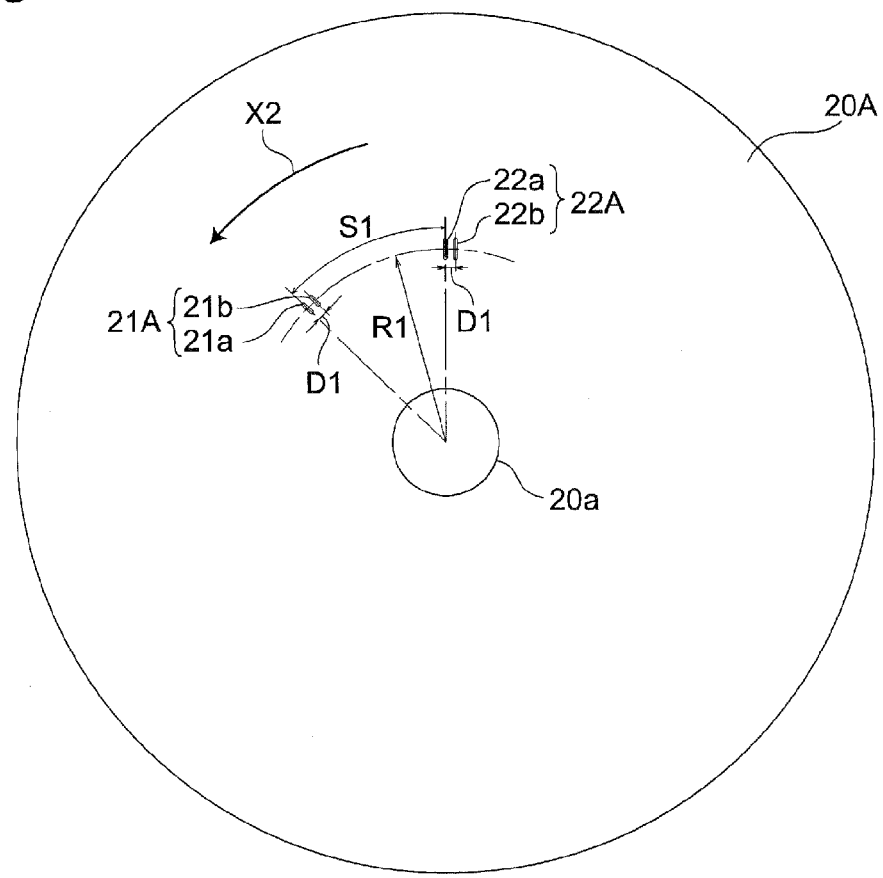
FIG. 18 is a plan view showing the lens cleaner according to the second embodiment of the present invention.
Figure 19:
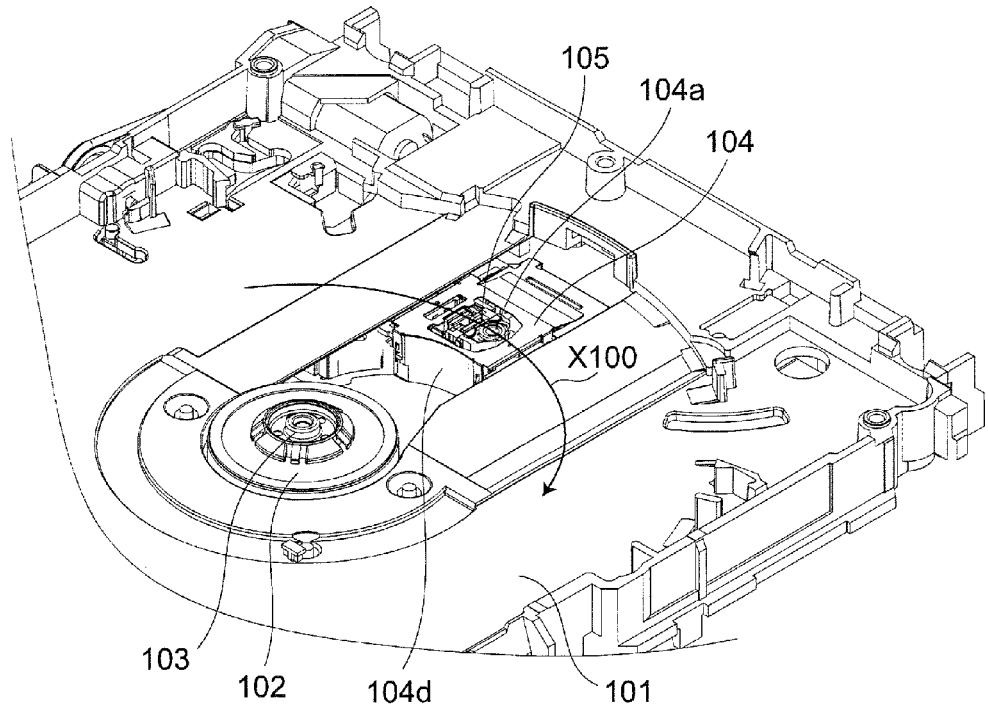
FIG. 19 is a partial enlarged perspective view of the structure of a conventional optical disc device.
Figure 20:
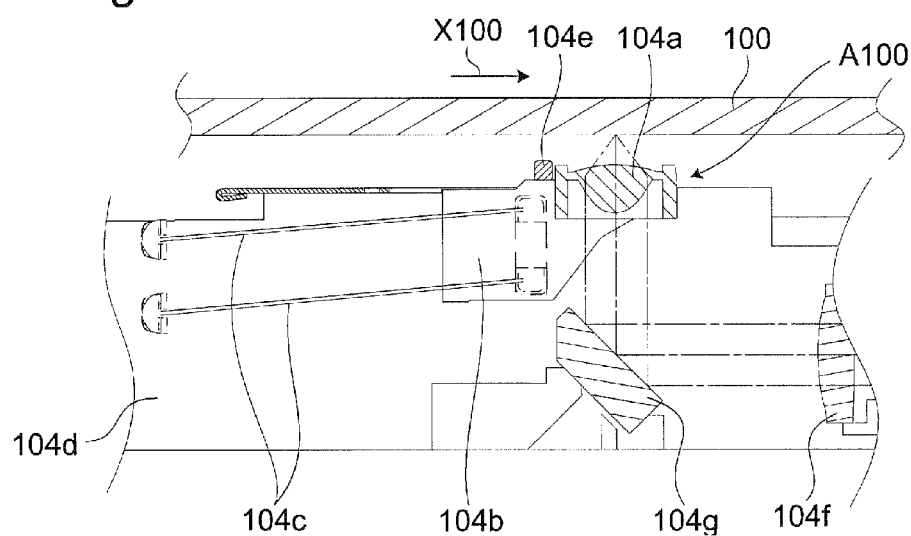
FIG. 20 is a partial enlarged schematic cross-sectional view of the conventional optical disc device when recording on or reproducing from an optical disc.
Figure 21:
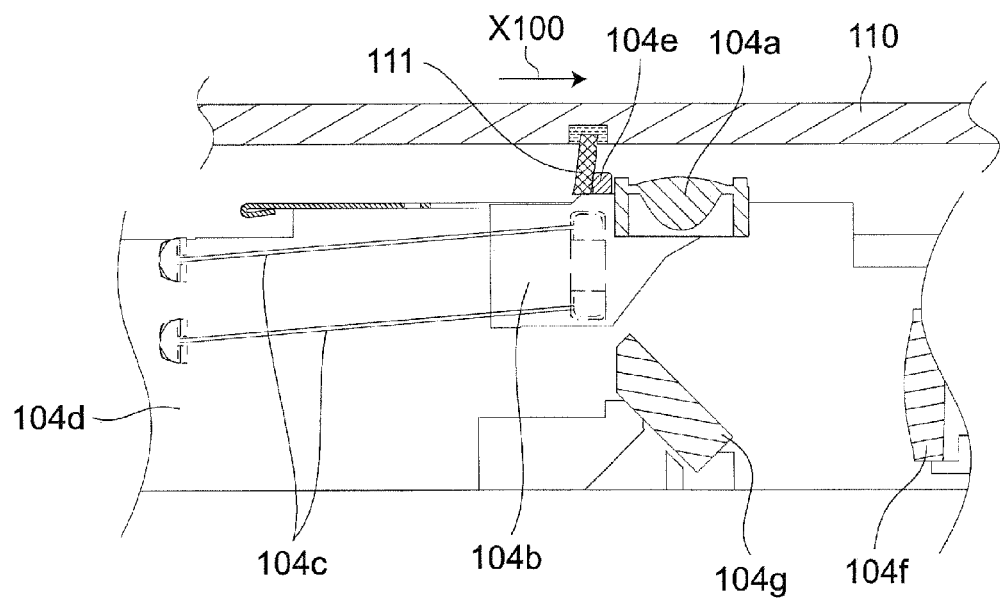
FIG. 21 is a cross-sectional view showing the manner of the conventional lens cleaner cleaning an objective lens.
Figure 22:
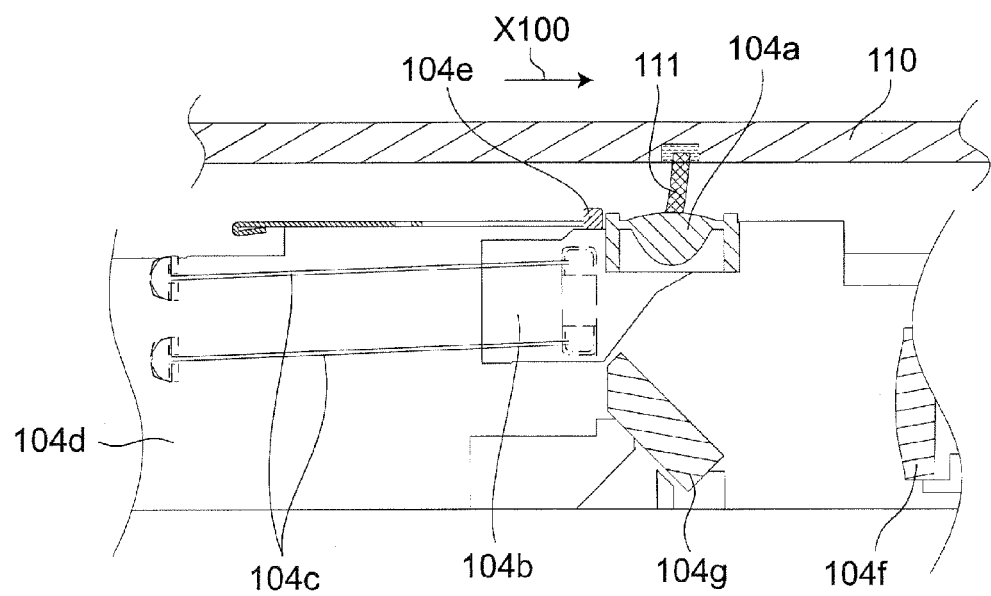
FIG. 22 is a cross-sectional view showing the manner of the conventional lens cleaner cleaning the objective lens.

With reference to FIGS. 17 and 18, a description will be given of a lens cleaner according to a second embodiment of the present invention. FIG. 17 is a perspective view of the lens cleaner, and FIG. 18 is a plan view of the lens cleaner.

A lens cleaner 20A according to the second embodiment is different from the lens cleaner 20 according to the first embodiment in that the first and second lens cleaning portions 21A and 22A are each structured by two different cleaning members 21a, 21b, 22a, and 22b. The cleaning members 21a to 22b are arranged in parallel with the rotation direction X2. Further, the cleaning member 21a and the cleaning member 21b are arranged so as to have a slight distance D1 (e.g., 1 mm) between each other. Similarly, the cleaning member 22a and the cleaning member 22b are arranged so as to have a slight distance D1 between each other.

In order to effectively clean grime off from the objective lens 4a, it is effective to employ a soft nonwoven fabric (e.g., Savina Minimax (registered trademark), available from KB SEIREN, LTD.) as the first and second lens cleaning portions 21A and 22A. Further, through use of such a soft nonwoven fabric as the first and second lens cleaning portions 21A and 22A, it becomes possible to suppress occurrence of any scratch on the surface of the optical disc. However, such a soft nonwoven fabric is less likely to be recovered once it collapses.

Accordingly, in the second embodiment, the first and second lens cleaning portions 21A and 22A are each structured by two cleaning members 21a, 21b, 22a, and 22b. Thus, even when the cleaning members 21a and 22a arranged on the downstream side in the rotation direction X2 collapse, the cleaning members 21b and 22b arranged on the upstream side in the rotation direction X2 can urge the recovery of the cleaning members 21a and 22a. Accordingly, a soft nonwoven fabric can be used for each of the cleaning members 21a to 22b, and the cleaning efficiency of the objective lens 4a can be improved.

It is noted that, the cleaning members 21b and 22b on the upstream side in the rotation direction X2 is preferably harder than the cleaning members 21a and 22a on the downstream side in the rotation direction X2. Thus, the recovery of the cleaning members 21a and 22a can further be facilitated.

It is noted that, though the first and second lens cleaning portions 21A and 22A are each structured by two cleaning members 21a, 21b, 22a, and 22b in the second embodiment, the present invention is not limited thereto. The first and second lens cleaning portions 21A and 22A may each be structured by three or more cleaning members. In this case also, the similar effect can be achieved.

Further, though both the first and second lens cleaning portions 21A and 22A are each structured by two cleaning members in the second embodiment, the present invention is not limited thereto. It is also possible to structure only one of the first and second lens cleaning portions 21A and 22A by two cleaning members. It is noted that, in this case, since it is the second lens cleaning portion 22A that mainly cleans the grime off from the objective lens 4a, it is preferable that the second lens cleaning portion 22A is structured by two or more cleaning members.

Third Embodiment

A description will be given of the structure of an optical disc device according to a third embodiment of the present invention. The optical disc device according to the third embodiment is different from the optical disc device according to the first embodiment in that: light is emitted from the objective lens 4a to the lens cleaner 20; a change in the distance between the objective lens 4a and the lens cleaner 20 is sensed based on a change in the intensity of the reflected light, and the rotation speed of the turntable 2 is controlled based on the change in the distance. It is noted that the control is exerted by an electronic component such as an LSI that is installed in the drive substrate 7 and that functions as the controller.

The vibration frequency and amplitude of the objective lens 4a when the objective lens 4a is brought into contact with the first lens cleaning portion 21A may vary attributed to the diameter or length of the suspension wires 4c, or changes over time. In this case, when the rotation speed of the turntable 2 is set to a specific speed, the second lens cleaning portion 22A may not be brought into contact with the objective lens 4a at its appropriate position, and the grime on the objective lens 4a may not fully be cleaned.

In contrast thereto, according to the third embodiment, the rotation speed of the turntable 2 is controlled based on the change in the distance between the objective lens 4a and the lens cleaner 20. Therefore, the second lens cleaning portion 22A can more surely be brought into contact with the objective lens 4a at its appropriate position. Accordingly, the grime on the objective lens 4a can more surely be cleaned off.

For example, it is assumed that, when the frequency of the objective lens 4a is 62.5 Hz, the rotation speed of the lens cleaner 20 that can bring the second lens cleaning portion 22A and the objective lens 4a into contact with each other at the appropriate position is 500 rpm. In this case, when the frequency of the objective lens 4a sensed based on the change in distance between the objective lens 4a and the lens cleaner 20 is 61 Hz, the rotation speed of the lens cleaner 20 is controlled to be 488 rpm (=61 Hz/62.5 Hz×500 rpm). Thus, the grime can more surely be cleaned off from the objective lens 4a.

It is noted that, the present invention is not limited to the embodiments described above, and can be practiced in other various modes. For example, in the foregoing, though the suspension wires 4c are used as the elastic member that elastically holds the objective lens 4a, the present invention is not limited thereto. Any elastic member can be used so long as it is capable of returning the objective lens 4a having been away from the recording or reproducing position A1 by the first lens cleaning portion 21 to the recording or reproducing position A1. In this case, the second lens cleaning portion 22 may be provided so as to be brought into contact with the objective lens 4a at the timing at which the objective lens 4a returns to the recording or reproducing position A1.

Further, though the lens cleaning portions are provided two in number in the foregoing, the present invention is not limited thereto. For example, the lens cleaning portions may be provided three in number. In this case, by employing the structure in which the objective lens 4a is vibrated by the first lens cleaning portion and the objective lens 4a is cleaned by the second and third lens cleaning portions, the objective lens 4a can be cleaned by the two lens cleaning portions while the lens cleaner 20 rotates one revolution. Thus, cleaning of the objective lens 4a can be performed more quickly. Further, provided that the second lens cleaning portion is grimed, the objective lens 4a can be cleaned by the third lens cleaning portion. Therefore, the cleaning effect can be improved.

It is noted that, any appropriate combinations of the embodiments described above can achieve their respective effects.

Although the present invention has been fully described in connection with the preferred embodiments thereof with reference to the accompanying drawings, it is noted that various changes and modifications are apparent to those skilled in the art. Such changes and modifications are to be understood as included within the scope of the present invention as defined by the appended claims unless they depart therefrom.

The lens cleaner of the present invention can more surely clean the grime off from the objective lens. Therefore, it is particularly useful for an optical disc device that is used in the environment where the objective lens is prone to be grimed.

The invention claimed is:

1. A lens cleaner which cleans an objective lens of an optical disc device,
the optical disc device comprising:
a spindle motor which rotates a turntable attached an optical disc; and
an optical head which emits light from the objective lens to the optical disc to perform recording or reproduction of information,
the optical head comprising:
an elastic member which elastically holds the objective lens at a recording or reproducing position; and
a lens protector which avoids contact between the optical disc and the objective lens, the lens protector being shiftable together with the objective lens and protruding toward the optical disc in close proximity to the objective lens and on an upstream side in a rotation direction of the turntable relative to the objective lens, wherein
the lens cleaner has first and second lens cleaning portions,
the first lens cleaning portion is provided so as to be brought into contact with the lens protector when the lens cleaner is attached onto the turntable and rotated, and to cause the objective lens to be away from the recording or reproducing position against an elastic force of the elastic member, and
the second lens cleaning portion is provided on the upstream side in the rotation direction relative to the first lens cleaning portion, the second lens cleaning portion being provided so as to pass above the lens protector while the objective lens is away from the recording or reproducing position by the first lens cleaning portion, and to be brought into contact with the objective lens when the objective lens returns to the recording or reproducing position by the elastic force of the elastic member.

2. The lens cleaner according to claim 1, wherein
the lens cleaner is formed to be disc-like, and
the first and second lens cleaning portions are provided on an identical circle about a rotation center of the lens cleaner.

3. The lens cleaner according to claim 1, wherein
a width of the first lens cleaning portion in a direction crossing the rotation direction is smaller than a width of the second lens cleaning portion in a direction crossing the rotation direction.

4. The lens cleaner according to claim 1, wherein
at least one of the first and second lens cleaning portions has a structure in which at least two cleaning members are arranged in parallel with the rotation direction.

5. The lens cleaner according to claim 4, wherein
out of the two cleaning members, one cleaning member arranged on a downstream side in the rotation direction is harder than other cleaning member arranged on the upstream side in the rotation direction.

6. An optical disc device, comprising an objective lens, wherein
the objective lens is cleaned by the lens cleaner according to claim 1.

7. An optical disc device in which an objective lens is cleaned by the lens cleaner according to claim 1, wherein
the optical disc device further comprises
a controller which emits light from the objective lens to the lens cleaner, which senses a change in a distance between the objective lens and the lens cleaner based on a change in an intensity of reflected light of the emitted light, and which controls a rotation speed of the turntable based on the change in the distance.

* * * * *